United States Patent
Tsai

[11] Patent Number: 5,752,290
[45] Date of Patent: May 19, 1998

[54] CASTER ASSEMBLY OF SHOPPING BAG

[76] Inventor: Wang Mei-Li Tsai, No. 103, Ta Min 1 Rd., Tan Tsu Hsian, Taichung Hsien, Taiwan

[21] Appl. No.: 795,799

[22] Filed: Feb. 5, 1997

[51] Int. Cl.$^6$ .................................................. B60B 33/06
[52] U.S. Cl. ........................................................... 16/34
[58] Field of Search ........................... 16/34, 32, 33, 16/19, 29; 280/43, 43.13, 47

[56] References Cited

U.S. PATENT DOCUMENTS

| 1,014,440 | 1/1912 | Benskin | 16/34 |
| 2,521,819 | 9/1950 | Baer | 16/34 |
| 2,783,055 | 2/1957 | Michaud | 16/34 |
| 2,812,189 | 11/1957 | Geldhof | 16/34 |
| 3,633,242 | 1/1972 | Wasofsky | 16/34 |
| 4,588,203 | 5/1986 | Anderson | 16/34 |
| 5,375,294 | 12/1994 | Garrett | 16/34 |

FOREIGN PATENT DOCUMENTS

| 874910 | 5/1942 | France | 16/34 |
| 48603 | 1/1992 | Japan | 16/34 |

*Primary Examiner*—Chuck Mah
*Attorney, Agent, or Firm*—Browdy and Neimark

[57] ABSTRACT

A caster assembly of a shopping bag is composed of a base for holding the shopping bag, two support frames fastened pivotally with the base such that the support frames can be folded and unfolded, two elastic elements enabling the support frames to return to a folded position from an unfolded position, two casters fastened pivotally with the support frames, and a locating member fastened pivotally with the support frames such that two arms of the locating member are located between the base and the support frames at such time when the locating member is folded, and that the arms of the locating member push the support frames to spread out at such time when the locating member is unfolded.

6 Claims, 4 Drawing Sheets

5,752,290

CASTER ASSEMBLY OF SHOPPING BAG

FIELD OF THE INVENTION

The present invention relates generally to a shopping bag, and more particularly to a caster assembly of the shopping bag.

BACKGROUND OF THE INVENTION

The conventional shopping bag is generally provided with two casters mounted on two support frames fastened pivotally to the underside of the shopping bag such that the support frames can be folded for a 90-degree angle, and that the support frames are spread out to be parallel to each other to allow the shopping bag to be kept in an upright position, and further that the shopping bag can be moved easily on the floor by means of the casters. The support frames can be folded to facilitate the easy storage of the shopping bag.

Such a prior art shopping bag as described above is defective in design in that the caster support frame is rather vulnerable to accidental folding at the time when the shopping bag is in use, thereby resulting in the collapse of the shopping bag.

SUMMARY OF THE INVENTION

The primary objective of the present invention is therefore to provide an improved caster assembly of a shopping bag. The improved caster assembly is capable of overcoming the drawbacks of the conventional caster assembly of a shopping bag.

In keeping with the principle of the present invention, the foregoing objective of the present invention is attained by the improved caster assembly, which is composed of a base, two support frames, two elastic elements, two casters, and a locating member. The base is fastened with the bottom underside of a shopping bag. The support frames are fastened pivotally with the base such that the support frames can be folded, thanks to the elastic elements. The casters are fastened with the support frames. The locating member is fastened pivotally with the support frames and is provided with two arms which are located between the base and the support frames when the locating member is folded. The arms are caused to force the support frames to remain in an unfolded position when the locating member is unfolded. The support frames are located by two arms when the locating member remains at the unfolded position.

DETAILED DESCRIPTION OF THE INVENTION

Figure 1:
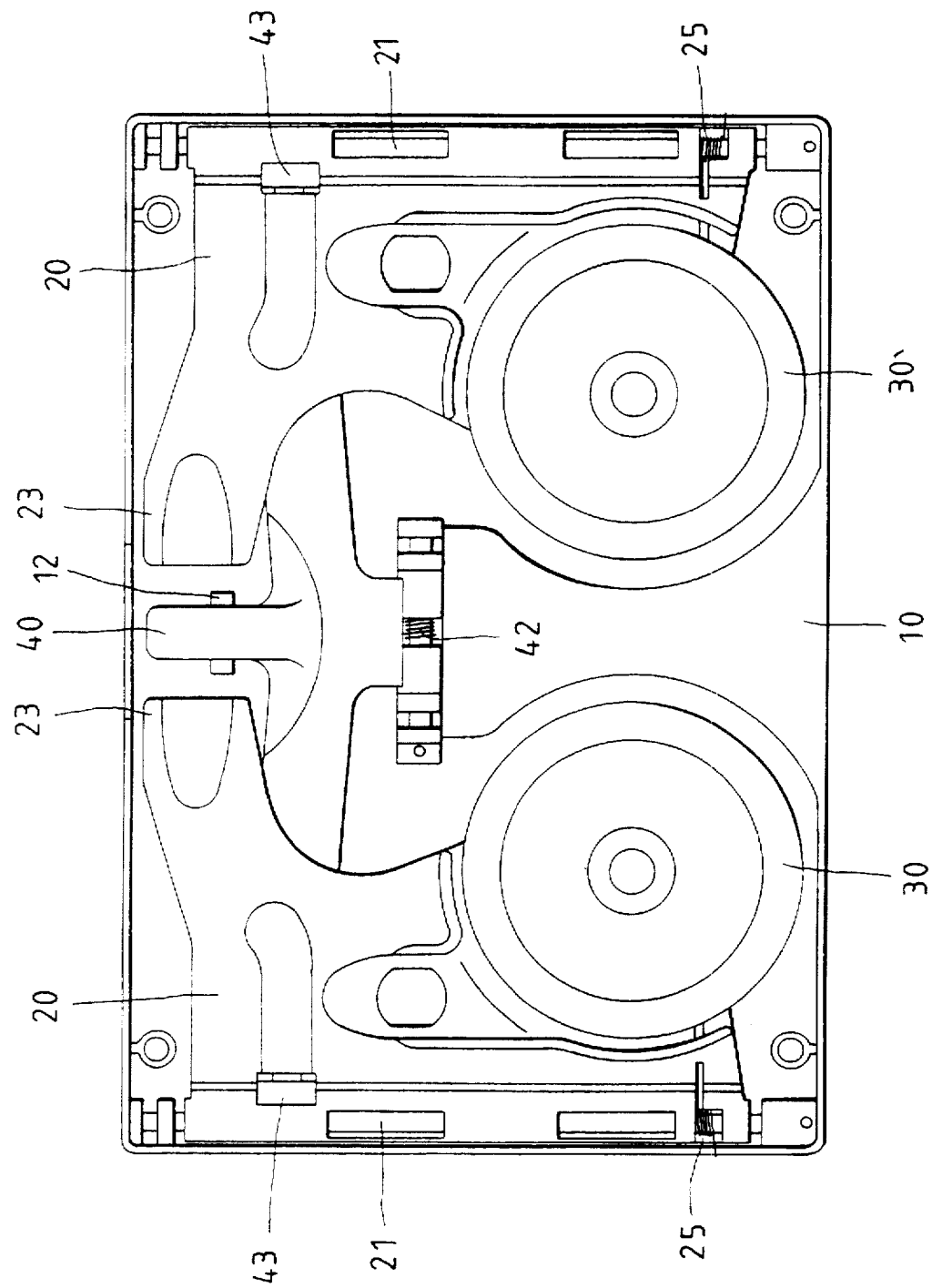
FIG. 1 shows a plan view of the present invention in a folded state.

As illustrated in FIGS. 1–5, a caster assembly of the present invention is intended to be used in conjunction with a shopping bag and is composed of the component parts, which are described explicitly hereinafter.

A base 10 is fastened with the bottom underside of a shopping bag (not shown in the drawings).

Figure 2:
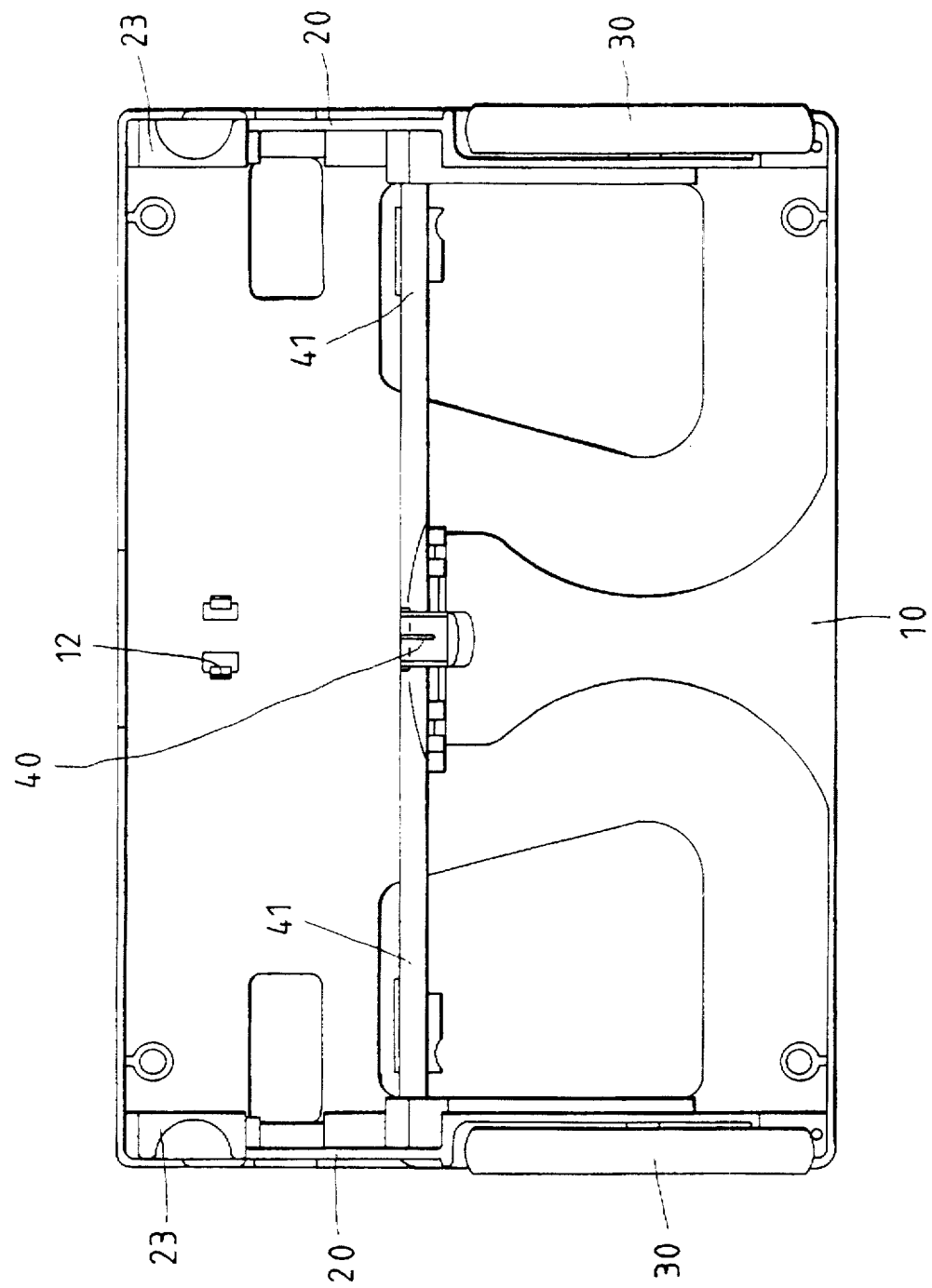
FIG. 2 shows a plan view of the present invention in an unfolded state.
Figure 3:
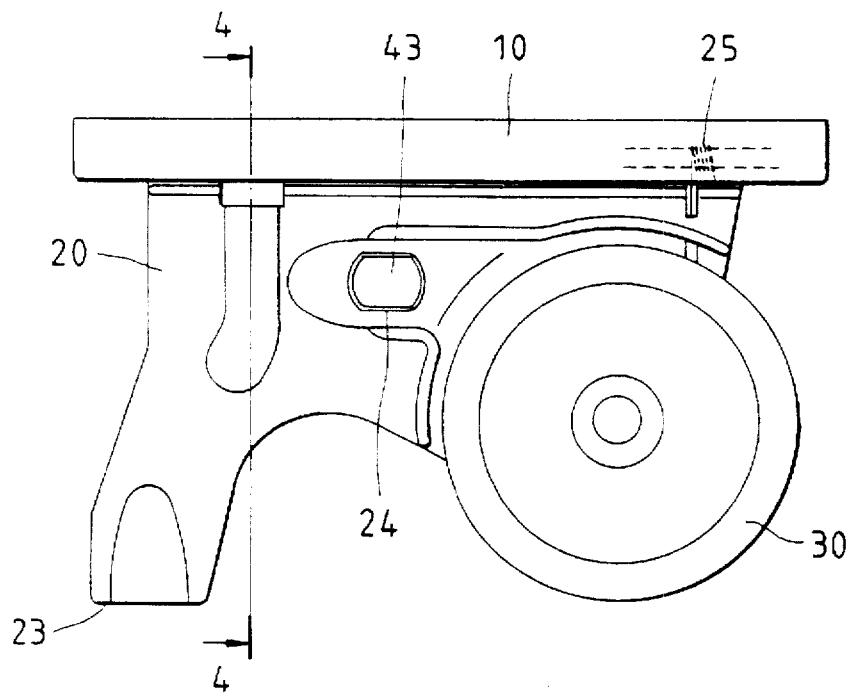
FIG. 3 shows a side view of the present invention in use.
Figure 5:
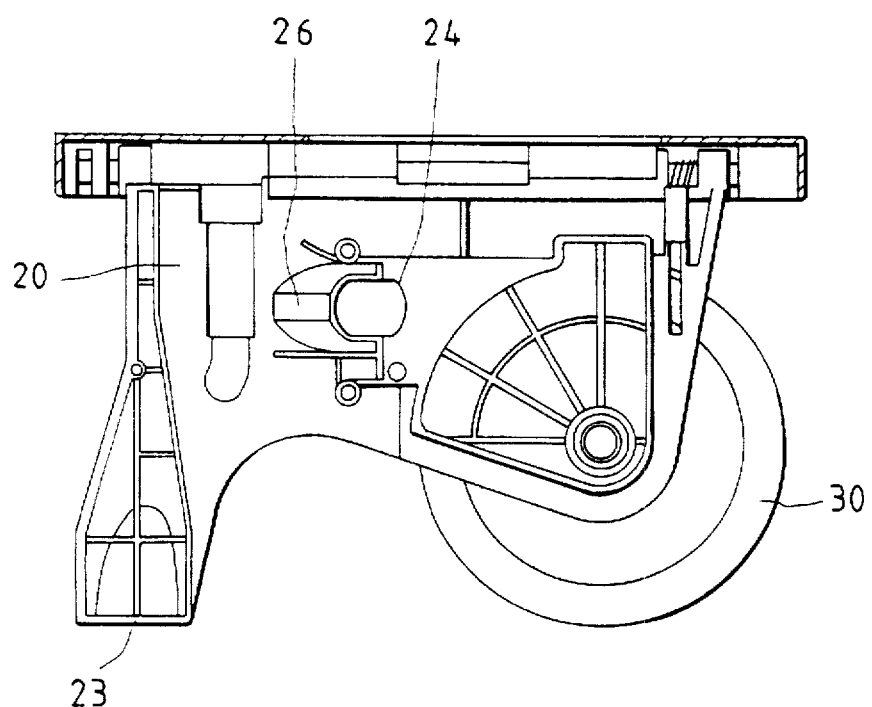
FIG. 5 shows a sectional view of a portion taken along the direction indicated by a line 5—5 as shown in FIG. 4.
Figure 4:
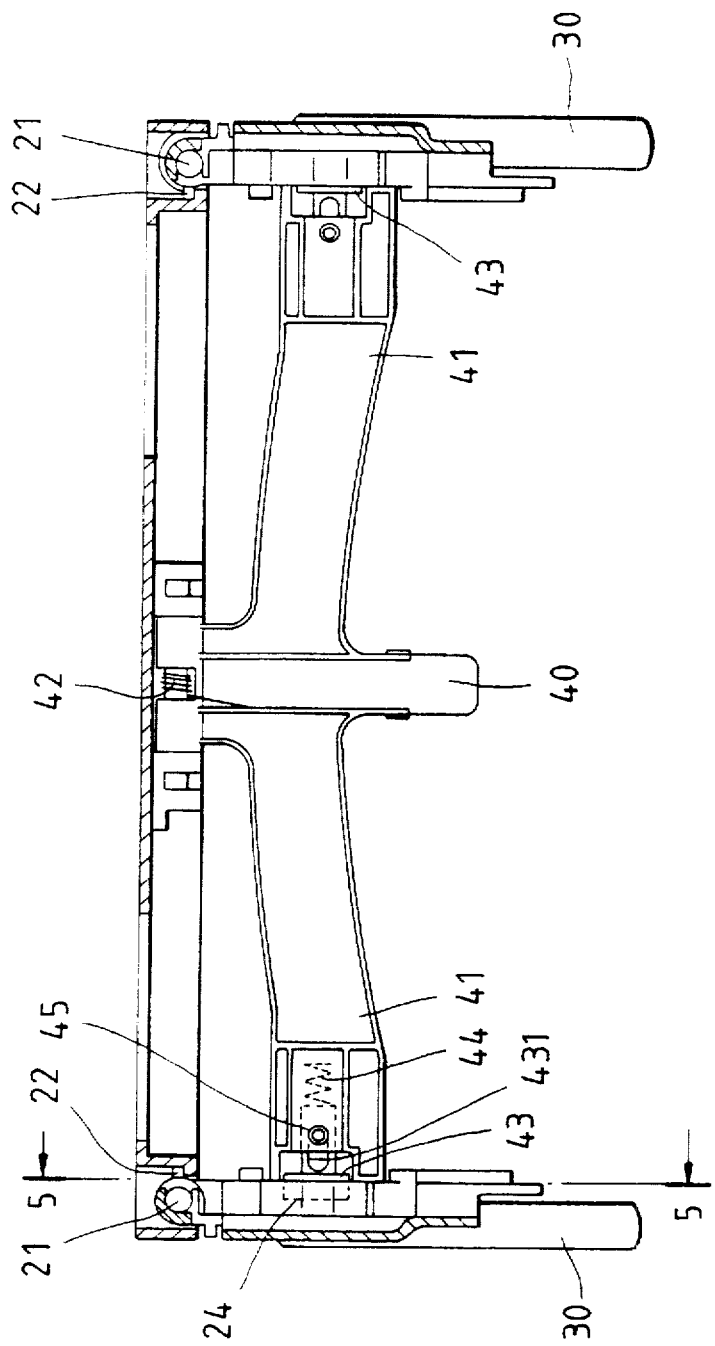
FIG. 4 shows a sectional view of a portion taken along the direction indicated by a line 4—4 as shown in FIG. 3.

Two support frames 20 are fastened pivotally with the base 10 by a shaft 21 such that the support frames 20 are capable of swiveling between a folded position (as shown in FIG. 1) and an unfolded position (as shown in FIG. 2). When the support frames 20 are in the folded position, they are rested against the base 10. On the other hand, when the support frames 20 are in the unfolded state, they are perpendicular to the base 10. The support frames 20 are provided respectively at the pivoting portion thereof with a plurality of locating projections 22 for confining the support frames 20 in such a manner that support frames 20 can not be swiveled to an extent that the angle formed between the base 10 and the support frame 20 is no greater than 90 degrees. The support frames 20 are provided respectively with a foot 23.

Two elastic elements 25 are used to keep the support frames 20 in a folded state. The elastic elements 25 are torsion springs and are fitted over the shafts 21 such that one end of the elastic element 25 urges the support frame 20 and that other end of the elastic element 25 urges the base 10.

Two casters 30 are fastened pivotally with the support frames 20 such that the two casters 30 and the two feet 23 form four contact points.

A locating member 40 is fastened pivotally with the base 10 such that the locating member 40 is located between the two support frames 20, and that the locating member 40 is capable of swiveling freely between a folded position, as shown in FIG. 1, and an unfolded position, as shown in FIG. 2. When the locating member 40 is in the folded state, it is rested against the base 10. When the locating member 40 is in the unfolded state, it is perpendicular to the planar surface where the base 10 is located. The locating member 40 has two arms 41. When the locating member 40 is in the folded state, the two arms 41 are located between the base 10 and the two support frames, as shown in FIG. 1. As the locating member 40 is unfolded, the two support frames 20 are forced by the two arms 41 to become unfolded and located.

In order to enhance the locating effect of the locating member 40, the locating member 40 is provided with an elastic element 42 located between the locating member 40 and the base 10 for keeping the locating member 40 in the unfolded position. Two arms 41 of the locating member 40 are provided respectively with a movable retaining member 43 which is located by an elastic element 44 located between the retaining member 43 and the locating member 40. The support frames 20 are provided respectively with a cavity 24 corresponding in location to the retaining member 43 for locating the retaining member 43, which is provided with a long slot 431 for receiving a pin 45. The support frames 20 are provided with an inclined surface 26 located in the inner side in which the cavity 24 is located. The base 10 is provided with a retaining portion 12 corresponding in location to the folded position of the locating member 40 for retaining the locating member 40 in the folded state.

In operation, the locating member 40 is moved downwards such that it is perpendicular to the base 10, and that the support frames 20 are pushed to spread out to remain parallel to each other, and further that the retaining members 43 of the two arms 41 of the locating member 40 are engaged with the cavities 24 of the support frames 20 so as to locate the support frames 20 securely in the unfolded state. As the locating member 40 is moved back to its original position, the support frames 20 are forced by the elastic force of the two elastic members 25 to return to their original folded state.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A caster assembly of a shopping bag, said caster assembly comprising:

a base for securing a shopping bag;

two support frames fastened pivotally with said base such that said support frames can be folded and unfolded, and that said support frames are in contact with said base when said support frames are folded, and further that said support frames are perpendicular to said base when said support frames are unfolded;

two elastic members fastened respectively with said support frames such that said elastic members are capable of forcing said support frames to return to a folded state from an unfolded state;

two casters fastened pivotally with said two support frames; and a locating member fastened pivotally with said base such that said locating member is located between said two support frames, and that said locating member can be folded and unfolded, and further that said locating member is in contact with said base when said locating member is folded, and still further that said locating member is perpendicular to said base when said locating member is unfolded, said locating member having two arms capable of being located between said base and said support frames at such time when said locating member is folded, said two arms further capable of pushing said support frames to spread out at such time when said locating member is unfolded.

2. The caster assembly as defined in claim 1, wherein said locating member and said base are provided therebetween with an elastic element capable of keeping said locating member in an unfolded state.

3. The caster assembly as defined in claim 1, wherein said two arms of said locating member are provided respectively with a retaining projection which is urged by an elastic element located between said retaining projection and said locating member; and wherein said two support frames are provided respectively with a retaining recess corresponding in location to and engageable with said retaining projection of said arms of said locating member.

4. The caster assembly as defined in claim 1, wherein said base is provided with a retaining portion capable of retaining securely said locating member when said locating member is folded.

5. The caster assembly as defined in claim 3, wherein said support frames are provided respectively in an inner side thereof with an inclined surface where said retaining recess is located.

6. The caster assembly as defined in claim 1, wherein said support frames are provided respectively at a pivoting portion thereof with a locating projection capable of confining each of said support frames to an extent that an angle formed between said each support frame and said base is no greater than 90 degrees.

* * * * *